(12) United States Patent
Bellamy et al.

(10) Patent No.: US 9,881,171 B2
(45) Date of Patent: Jan. 30, 2018

(54) PRIVACY PROTECTING SENSING DEVICES (71) Applicant: International Business Machines Corporation, Armonk, NY (US)

(72) Inventors: Rachel K.E. Bellamy, Bedford, NY (US); Thomas D. Erickson, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 14/941,912

(22) Filed: Nov. 16, 2015

(65) Prior Publication Data
US 2017/0140164 A1 May 18, 2017

(51) Int. Cl.
G06F 21/62 (2013.01)
H04L 12/18 (2006.01)

(52) U.S. Cl.
CPC .......... G06F 21/6218 (2013.01); H04L 12/18 (2013.01)

(58) Field of Classification Search
CPC .............................. G06F 21/6218; H04L 12/18
See application file for complete search history.

(56) References Cited

U.S. PATENT DOCUMENTS

| 6,067,399 | A | 5/2000 | Berger |
| 7,447,332 | B2 | 11/2008 | Horii et al. |
| 7,728,906 | B2 | 6/2010 | Bilbrey |
| 7,742,656 | B2 | 6/2010 | Lee |
| 7,940,302 | B2 | 5/2011 | Mehrotra et al. |
| 8,098,282 | B2 | 1/2012 | Gopinath et al. |
| 8,123,419 | B2 | 2/2012 | Cirker |
| 8,212,872 | B2 | 7/2012 | Sablak |
| 8,632,264 | B2 | 1/2014 | Schmit et al. |
| 8,646,032 | B2 | 2/2014 | Aad et al. |
| 8,888,385 | B2 | 11/2014 | Cirker |
| 8,896,718 | B2 | 11/2014 | Stedman et al. |
| 2003/0023451 | A1 | 1/2003 | Willner et al. |
| 2004/0145657 | A1 | 7/2004 | Yamamoto et al. |
| 2006/0137018 | A1 | 6/2006 | Herschaft |
| 2006/0206911 | A1 | 9/2006 | Kim et al. |
| 2007/0103552 | A1 | 5/2007 | Patel et al. |
| 2007/0296817 | A1 | 12/2007 | Ebrahimi et al. |

(Continued)

FOREIGN PATENT DOCUMENTS

CN 102647550 A 8/2012
CN 104038740 A 9/2014
(Continued)

OTHER PUBLICATIONS

Winkler et al. (User Centric Privacy Awareness in Video Surveillance, 2011, 35 pages).*

(Continued)

Primary Examiner — Oleg Korsak
(74) Attorney, Agent, or Firm — Yeen Tham; Ryan, Mason & Lewis, LLP (57) ABSTRACT

Information regarding one or more sensing devices in an environment is broadcasted. The broadcasted information is received by a user application running on a user device in the environment. The broadcasted information comprises information regarding presence of the one or more sensing devices in the environment and at least one of a capacity profile and an activity profile of the one or more sensing devices.

20 Claims, 6 Drawing Sheets

(56) References Cited

U.S. PATENT DOCUMENTS

| | | | |
|---|---|---|---|
| 2008/0181533 A1* | 7/2008 | Jung | G06K 9/3241 |
| | | | 382/283 |
| 2009/0189981 A1 | 7/2009 | Siann et al. | |
| 2009/0300512 A1* | 12/2009 | Ahn | G06F 21/34 |
| | | | 715/747 |
| 2010/0149330 A1 | 6/2010 | Salgar et al. | |
| 2012/0013744 A1 | 1/2012 | Piel et al. | |
| 2012/0147184 A1 | 6/2012 | Siann et al. | |
| 2013/0174211 A1* | 7/2013 | Aad | G06F 21/604 |
| | | | 726/1 |
| 2014/0176663 A1 | 6/2014 | Cutler et al. | |
| 2014/0333772 A1 | 11/2014 | Periyasamy et al. | |
| 2015/0104103 A1 | 4/2015 | Candelore | |

FOREIGN PATENT DOCUMENTS

| | | |
|---|---|---|
| EP | 1081955 A2 | 3/2001 |
| WO | 0013411 A1 | 3/2000 |
| WO | 2013144966 A1 | 10/2013 |
| WO | 2014084996 A2 | 6/2014 |
| WO | 2014100455 A1 | 6/2014 |

OTHER PUBLICATIONS

Winkler et al. (Secure Embedded Visual Sensing in End-User Applications with TrustEYE.M4. IEEE, 6 pages, Apr. 7-9, 2015).*
F. Dufaux et al., "Scrambling for Privacy Protection in Video Surveillance Systems," IEEE Transactions on Circuits Systems for Video Technology, Aug. 2008, pp. 1168-1174, vol. 18, No. 8.

* cited by examiner

PRIVACY PROTECTING SENSING DEVICES

BACKGROUND

Cameras, microphones and other sensing devices are nearly ubiquitous. Environments ranging from a small conference room to larger rooms such as, e.g., classrooms and auditoriums, whether private or public, indoor or outdoor, are becoming known as "smart environments," as more and more sensing devices become a part of such environments. Moreover, recent advancements in sensing device technology are raising individual privacy concerns as some of these sensing devices comprise capabilities, which many participants in an environment are often unaware. For instance, a camera may have extremely high resolution and be capable of zooming in and focusing to the extent that a relatively distant camera can enable text on the screen of a laptop, tablet or phone to be read. A camera may also be able to capture infrared input, permitting watchers to make inferences about emotional states of those under observation. Analogously, a high-end speaker phone located in a meeting room may be capable of triangulating on a person in the room who is whispering to a neighbor and increasing its gain sufficiently to pick up and broadcast the whisper to a remote audience. Furthermore, a sensing device's resolution and tracking may be fine-grained enough that biophysical signs such as, e.g., pulse and breathing rates, or eye dilation may be discerned, all of which can permit inferences about emotional states of the participants in an environment.

SUMMARY

Embodiments provide techniques for protecting privacy in environments equipped with one or more sensing devices.

For example, in one embodiment, a method comprises broadcasting information regarding one or more sensing devices in an environment to a user device in the environment. The broadcasted information comprises information regarding presence of the one or more sensing devices and at least one of a capacity profile and an activity profile of the one or more sensing devices.

DETAILED DESCRIPTION

Illustrative embodiments of the invention may be described herein in the context of illustrative methods, systems and apparatus for protecting privacy in environments equipped with one or more sensing devices. However, it is to be understood that embodiments of the invention are not limited to the illustrative methods, systems and apparatus, but instead are more broadly applicable to other suitable methods, systems and apparatus.

The term "sensing device" refers to video cameras, other image capturing devices, or other types of sensors including, but not limited to, hidden surveillance cameras, ceiling-mounted video cameras, cameras that are part of telepresence robots, or cameras that are part of personal devices like portable computers, tablets and smartphones. It should also be noted that the term "sensing device" is not only associated with cameras but with other sensing devices, such as, for example, microphones in video conferencing systems, speaker phones or cell phones that may form part of an environment. Still further, the term "sensing device" may also refer to a device configured to capture one or more biophysical signs (attributes) from individuals in an environment.

The term "environment" refers to a physical place where there is human interaction. An environment may comprise, but is not limited to, an outdoor or indoor geographic area, a building or a room within a building, or a public or private setting for any type of gathering.

Embodiments of the present invention are concerned with supporting individual privacy for a variety of reasons, ranging from the practical (people do not work as effectively or communicate as freely when believing themselves under surveillance) to the principled (basic human rights and legal considerations call for respecting individual privacy). Embodiments of the present invention are not limited to whether or not people are being observed or recorded, but also the degree and ways in which people are visible to one or more sensing devices present in an environment.

Figure 1A:
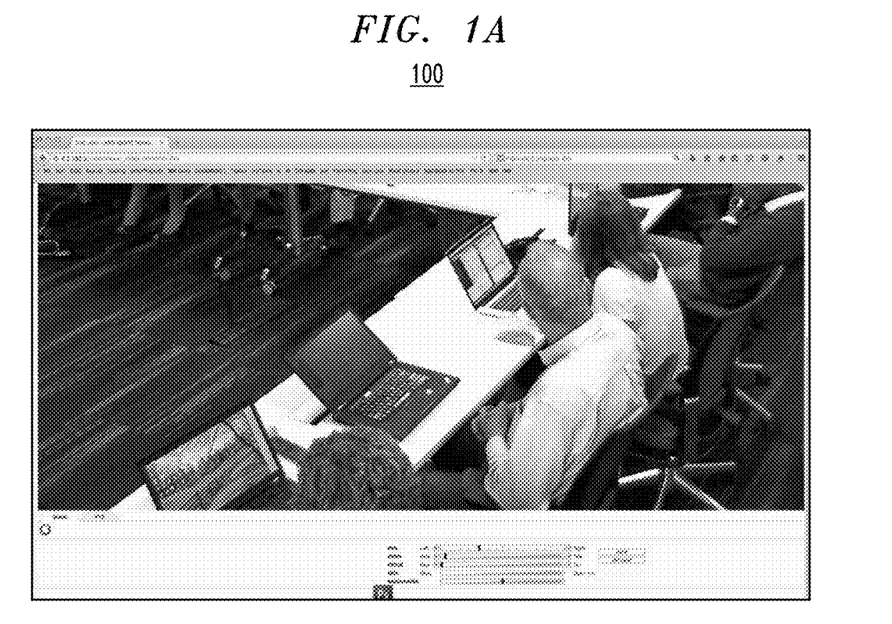
FIG. 1A is a first view of an environment from a sensing device.
Figure 1B:
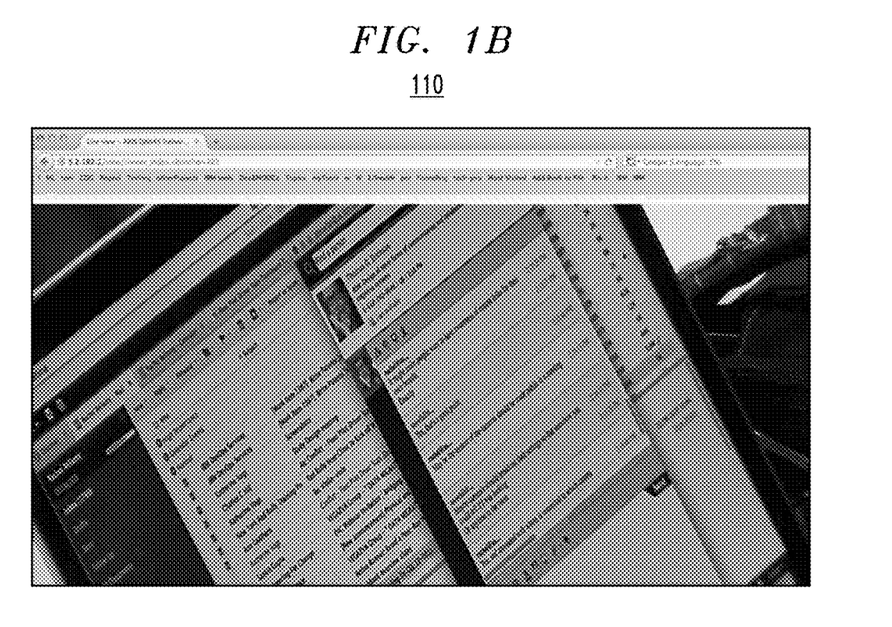
FIG. 1B is a second view of the environment from FIG. 1A from the same sensing device.

Referring now to FIG. 1A, an environment 100 is illustrated in a first viewpoint from a ceiling-mounted sensing device, for example, a surveillance video camera. The environment 100 comprises multiple participants, each with at least one user device, participating in a group conference. In such environment, the meeting participants are aware that they are being recorded and such view as illustrated in FIG. 1A does not appear to pose any privacy-related issues. However, referring now to FIG. 1B, an environment 110 is illustrated as a second viewpoint of the environment 100 from the same ceiling-mounted sensing device. In this view, the surveillance video camera is zoomed into a participant's laptop screen and words on the screen are readable. The participant may have been aware of the presence of the surveillance video camera but not of its zooming capabilities. Thus, while the first viewpoint shown in FIG. 1A may appear permissible, the second viewpoint shown in FIG. 1B may be disturbing to some participants.

Figure 2:
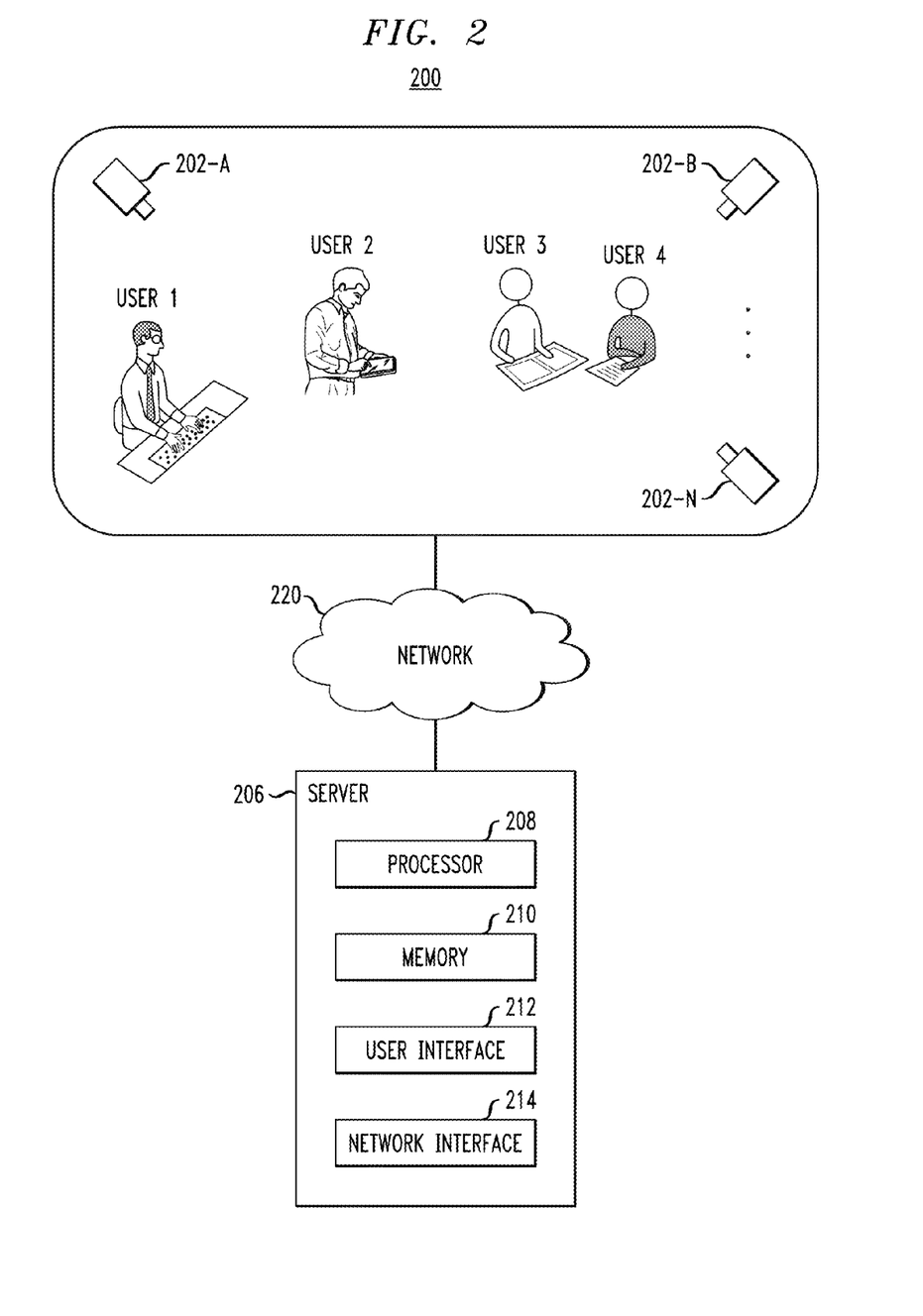
FIG. 2 illustrates an exemplary environment with one or more users under surveillance by one or more sensing devices, according to an embodiment of the invention.

Referring now to FIG. 2, an environment 200 comprises one or more sensing devices 202-A, 202-B . . . 202-N (collectively referred to as sensing devices 202) including, but not limited to, video and/or still cameras, motion sensors, infrared sensors and acoustic sensors. The sensing devices 202 may be installed as Internet of Things (IoT) elements in the environment. IoT is a term that refers to a network computing environment in which physical terms ("things") such as devices, objects and other things, etc., are equipped with unique identifiers, network connectivity and other embedded technologies, which allows such devices, objects and items to sense, communicate, interact and send/receive data over one or more communications networks (e.g., Internet, etc.) without requiring human-to-human or human-to-computer interaction. In accordance with an embodiment, one or more of the sensing devices 202 may be located and distributed in the environment providing suitable vantage points, including, for example, higher altitude locations such as the ceiling, lamp posts, or on tall buildings.

One or more of the sensing devices 202 may comprise a capacity profile associated with the sensing device that defines its capabilities, functionalities and parameters. For instance, a capacity profile for a sensing device may define its nature of what it senses (e.g., visual input, infrared input, audio input, etc.), the resolutions at which it is capable of sensing, and other parameter ranges.

One or more of the sensing devices 202 may further comprise an activity profile associated with the sensing device that provides information about its current status. For instance, an activity profile for a sensing device may provide information about who is connected to the sensing device, what its current parameter settings are, and whether these parameters are being changed (e.g., is a camera being zoomed in).

Furthermore, one or more of the sensing devices may comprise a controller module which controls the capabilities, functionalities and parameters of the sensing device. The controller module associated with a sensing device may allow a remote user or a user device in connection with the sensing device to control operation of the sensing device.

The environment 200 further comprises a plurality of users, each with at least one user device. One or more of the plurality of users in the environment 200 may be aware of the presence of the one or more sensing devices 202 but not of the specific capabilities, functionalities and parameters of the sensing devices 202.

In environment 200, each user may be associated with a privacy profile which specifies what sort of information a sensing device is permitted to sense and puts limits on the resolution of that sensing. For instance, User 1 in environment 200 may be working on a computer displaying sensitive information on a computer screen. A privacy profile associated with User 1 may specify that video surveillance of User 1 and his user devices is prohibited. In another instance, User 2 in environment 200 may be reading an e-mail on a tablet device. A privacy profile associated with User 2 may limit the resolution of a sensing device, e.g., limiting video recording functionality to less than one frame per second. As a further example, User 3 and User 4 in environment 200 may be negotiating terms of a contract. Individual privacy profiles associated with Users 3 and 4 respectively may specify that speech that is two standard deviations or more below the average volume for a surveillance may not be tracked.

It should be noted that a privacy profile may also be associated with an individual, group and/or an environment. For instance, an individual's privacy profile may be created by that individual and sent to an environment prior to entering the environment. In another instance, a group of participants may agree on a common privacy profile prior to entering an environment. Furthermore, an environment may comprise a privacy profile, which varies depending on time and the type of activity planned for the environment.

The environment 200 may further comprise a server 206 which may be located within the environment 200 or in a location remote from the environment 200. The server 206 may be operatively coupled to the sensing devices 202 via a communications network 220. The server 206 may include, but is not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The server 206 may include one or more processors 208 coupled to a memory 210, a user interface 212 and a network interface 214. The user interface 212 may be configured to enable user input into the server 206. The network interface 214 may be configured to enable the server 206 to interface with the network 220 and other system components (e.g., the sensing devices 202).

In the environment 200, information regarding the one or more sensing devices 202 is broadcasted to at least one user device in the environment. The broadcasted information may comprise information regarding presence of the one or more sensing devices and at least one of a capacity profile and an activity profile of the one or more sensing devices. One or more of the sensing devices 202 may be capable of directly broadcasting the information to the at least one user device in the environment. Such sensing devices may comprise a memory for storing capacity and activity profiles and a processor operatively coupled to the memory and configured to send/receive information to/from the at least one user device. Such sensing devices may be referred to as "augmented sensing devices." Alternatively, the server 206 in connection with the one or more sensing devices 202 over the network 220 may broadcast the information regarding the one or more sensing devices 202 to the user device in the environment. The server 206 may receive privacy profiles and adjust operation of the sensing devices 102 accordingly.

Figure 3:
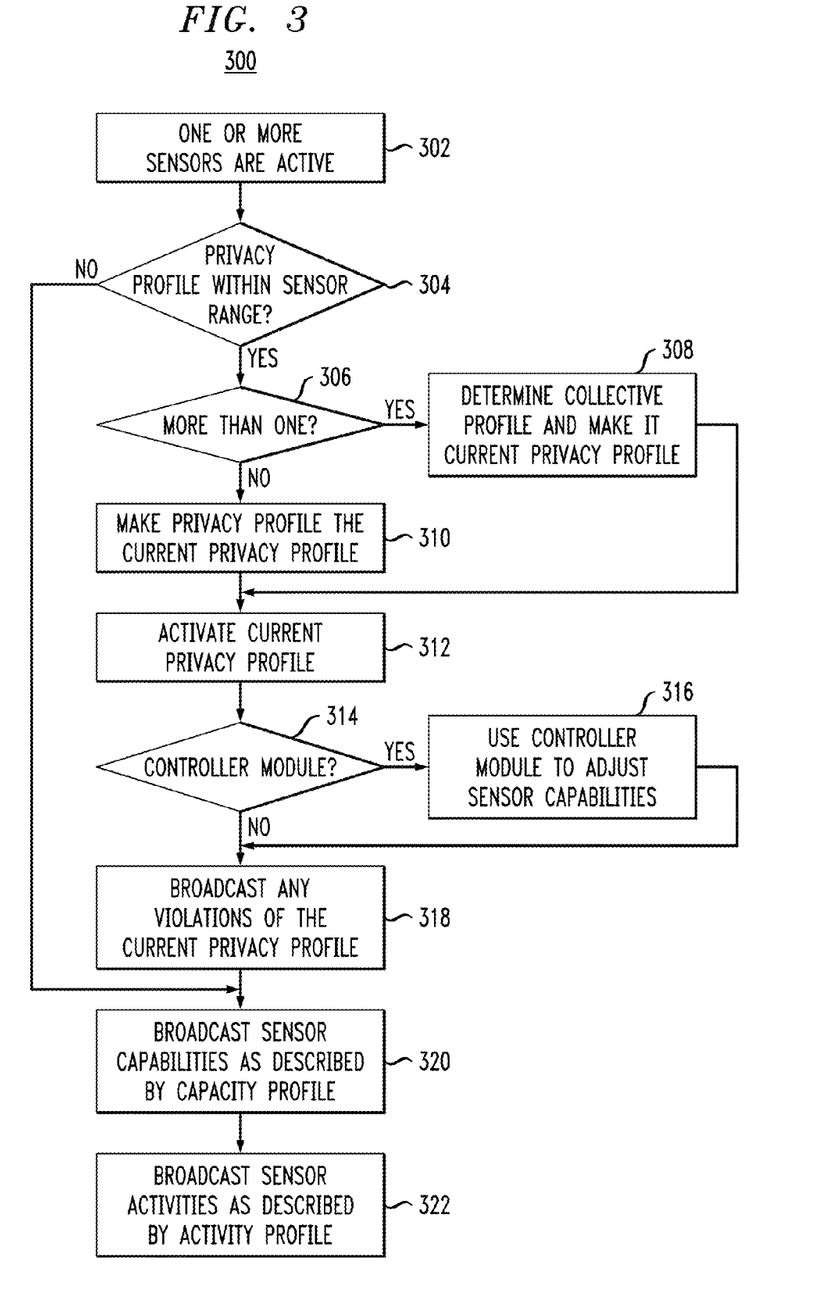
FIG. 3 is an overview flow diagram of a method for protecting privacy in an environment equipped with sensing devices, according to an embodiment of the invention.

Referring now to FIG. 3, a flow diagram for a methodology 300 for protecting privacy in environments equipped with one or more sensing devices, according to an embodiment of the present invention, is shown. The flow diagram 300 begins with step 302 in which one or more sensing devices are active in an environment and the environment comprises a plurality of users each with at least one user device. One or more of the plurality of users in the environment may have an individual associated privacy profile or a group privacy profile, or the environment may have a room privacy profile, as described above. In the next step, one or more of the privacy profiles are detected by the one or more sensing devices in the environment (step 304). A sensing device may detect a privacy profile by, for example, receiving the privacy profile directly from a user device, detecting presence of a user associated with a privacy profile within a predetermined range, or receiving one or more notifications from a server. If a privacy profile is not detected, the methodology 300 moves to steps 320 and 322. In step 320, sensing device capabilities as described by a capacity profile associated with the sensing device are broadcasted to at least one user device and in step 322, sensing device activities as described by an activity profile associated with the sensing device are broadcasted to the at least one user device. Steps 320 and 322 may be carried out simultaneously or sequentially. As described above, broadcasting may be done directly by the sensing devices or via a server in connection with the sensing devices. The at least one user device may comprise a user application configured to receive the broadcasted information.

If one or more privacy profiles are detected, then in the next step, a determination is made as to whether a single privacy profile or a plurality of privacy profiles are detected (step 306). If only a single privacy profile is detected, the detected privacy profile is assigned as the current privacy policy (step 310) and is activated (step 312). If a plurality of privacy profiles are detected, for example, from a group of users each comprising a privacy profile, an algorithm is applied to determine a collective profile (step 308). The algorithm may comprise, for example, a decision rule making the most restrictive privacy profile as the collective profile. Once a collective profile is determined, it is activated (step 312). Activating a privacy policy refers to adjusting the capabilities, functionalities and parameters of the sensing devices in compliance with the privacy policy. Adjusting the capabilities, functionalities and parameters may be performed automatically upon receipt of the privacy profile or via a remote server configured to control operation of the sensing devices pursuant to the activated privacy policy.

Alternatively, once a privacy profile is activated, a decision may be made as to whether each of the sensing devices affected by the privacy profile comprises a controller module (step 314). If a sensing device affected by the activated privacy profile has a controller module, the controller module may automatically adjust one or more capabilities, functionalities and parameters of the sensing device to comply with the activated privacy profile (step 316). If a sensing device's controller module is unable to adjust the one or more capabilities, functionalities and parameters of the sensing device to fully comply with the activated privacy profile, any current and future violation of the activated privacy profile is broadcasted (step 318) along with the elements of the sensor's capacity profile (step 320) and activity profile (step 322) that are out of compliance. A user via a user application installed on at least one user device, may have access to the controller module and control operation of the sensing devices manually. If one or more of the sensing devices do not have a controller module, any current and future violation of the activated privacy profile is broadcasted (step 318) along with the capacity profile (step 320) and activity profile (step 322).

Figure 4:
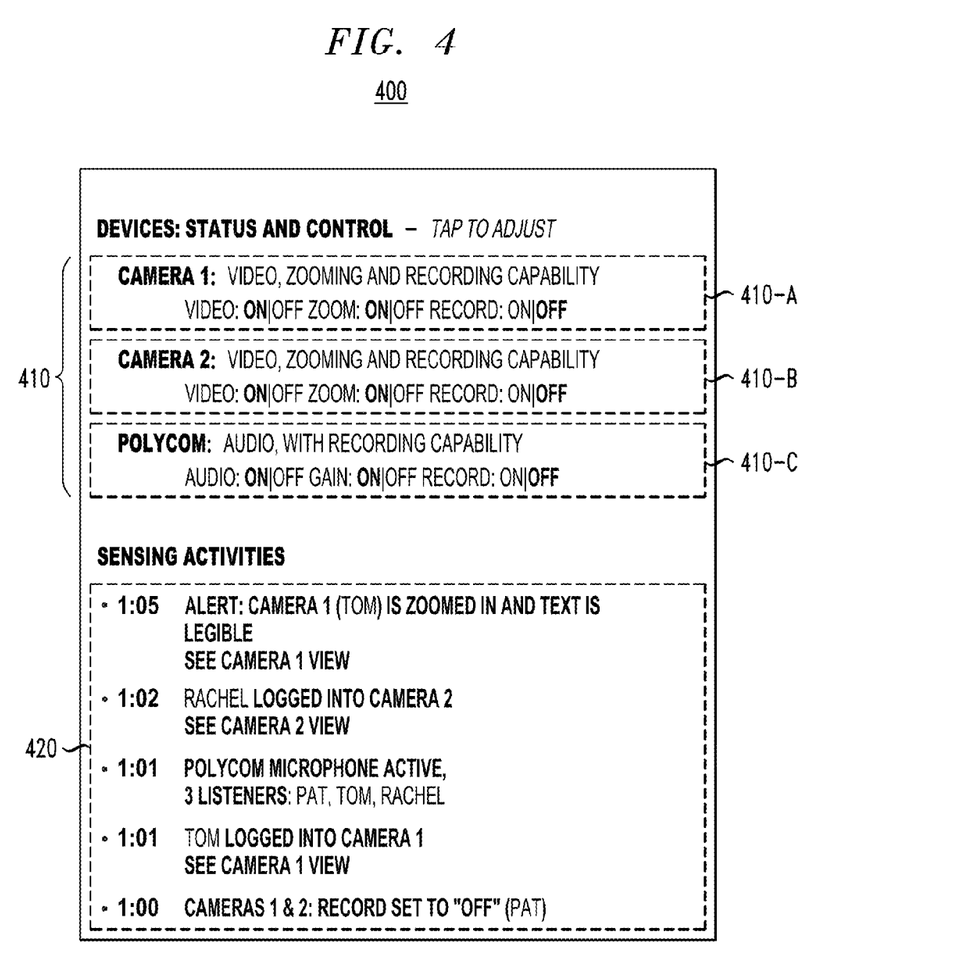
FIG. 4 is an exemplary broadcasted information appearing on a user device, according to an embodiment of the invention.

Referring now to FIG. 4, an exemplary information 400 broadcasted, is described. Such information may be received for example, on a user device, via a user application installed on the user device. The broadcasted information may appear on the screen of the user device as shown in FIG. 4. The broadcasted information 400 comprises a capacity profile portion 410 and an activity profile portion 420. Within the capacity profile portion 410, sections marked with 410-A and 410-B refer to a first and second camera in an environment, respectively and of their capabilities, functionalities and parameters (e.g., video, zooming and recording capabilities). Similarly, an audio sensing device is described in 410-C as having recoding capability. The capacity profile portion 410 also shows current status of each of the sensing devices. The user may be allowed to adjust operation of each of the capabilities via the user device (e.g., by tapping on the screen).

The activity profile portion 420 lists chronologically all activities with respect to the one or more sensing devices. For example, the activity profile may comprise information on when a sensing device is activated, who is logged into the sensing device and viewing and current status (e.g., is the device zoomed in).

It is to be noted that embodiments of the present invention apply to any type of sensing devices, not just cameras. Embodiments described above do not require individuals to set up privacy parameters in advance, but rather only require the individual to run a privacy-protection application on a user device. By putting control in hands of the users, embodiments described above enable users to make decisions on the degree of surveillance that is acceptable on a case by case basis.

Embodiments of the present invention as described above may be applied in numerous environment settings. For instance, embodiments of the present invention may be applied in a "cognitive room." A "cognitive room" is a high-end meeting environment for enterprises. It supports, for example, complex analysis, decision-making and customer briefings. It may include large displays, multiple cameras, microphones and other sensing devices or speech Input/Output, gesture and face recognition, recording, remote access, etc. In such environment, it is important that users—both enterprise members and visitors—feel comfortable. If all participants in the cognitive room are aware of what sort of sensing devices are present and when and how they are being used, they would feel more comfortable. Additionally, if the participants were allowed to exercise control over the sensing devices, such feature may promote social acceptance and reduce negative aspects of sensing devices.

In another instance, embodiments of the present invention may be applied as a component of "hospital in a box." "Hospital in a box" refers to situations where people like to know that they are being watched and who is watching them. If a patient is receiving home-care service, placing privacy-protecting sensing devices around the house and leveraging positive aspects of knowing who is watching may promote motivational aspect and provide additional feeling of security. For example, if a patient engaged in occupational therapy is aware that a specialist is watching, the patient may feel psychologically more secure and possibly more motivated to improve his or her performance.

In yet another instance, application of the embodiments of the present invention in educational settings such as classrooms may promote some students to improve their behaviors if they are made aware that a parent is watching. Alternatively, if a person, especially a minor, is walking home late knowing that parts of the route are equipped with sensing devices as described in the above embodiments and the person is aware of who is watching, e.g., the police, a greater assurance of security may be established.

Embodiments of the invention may be a system, a method, and/or a computer program product at any possible technical detail level of integration. The computer program product may include a computer readable storage medium (or media) having computer readable program instructions thereon for causing a processor (e.g., processor 208) to carry out aspects of the present invention. For example, computer system/server 206 may comprise a computer program product for implementing embodiments of the invention disclosed herein.

The computer readable storage medium (e.g., memory 210) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface (e.g., network interface 214) in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network (e.g., network 120), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
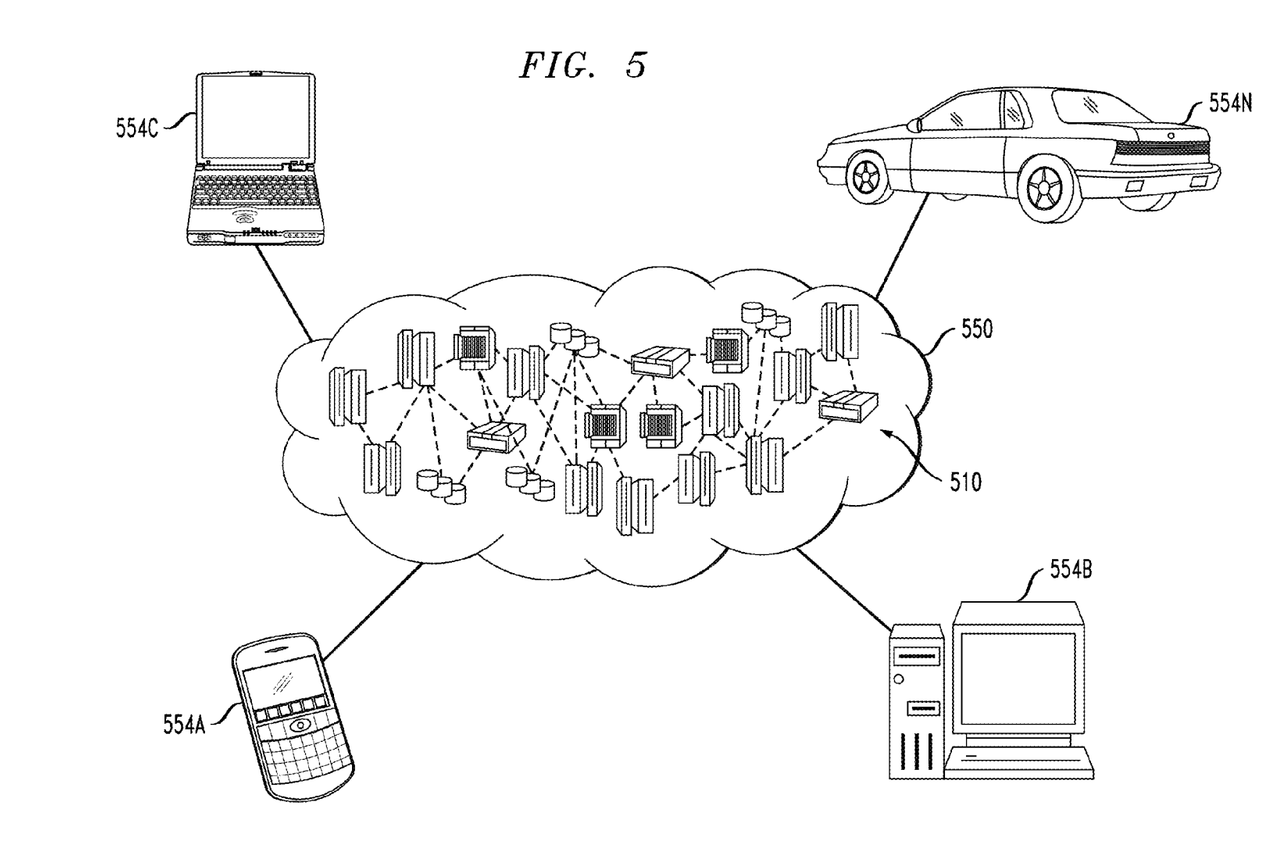
FIG. 5 illustrates a cloud computing environment, according to an embodiment of the invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
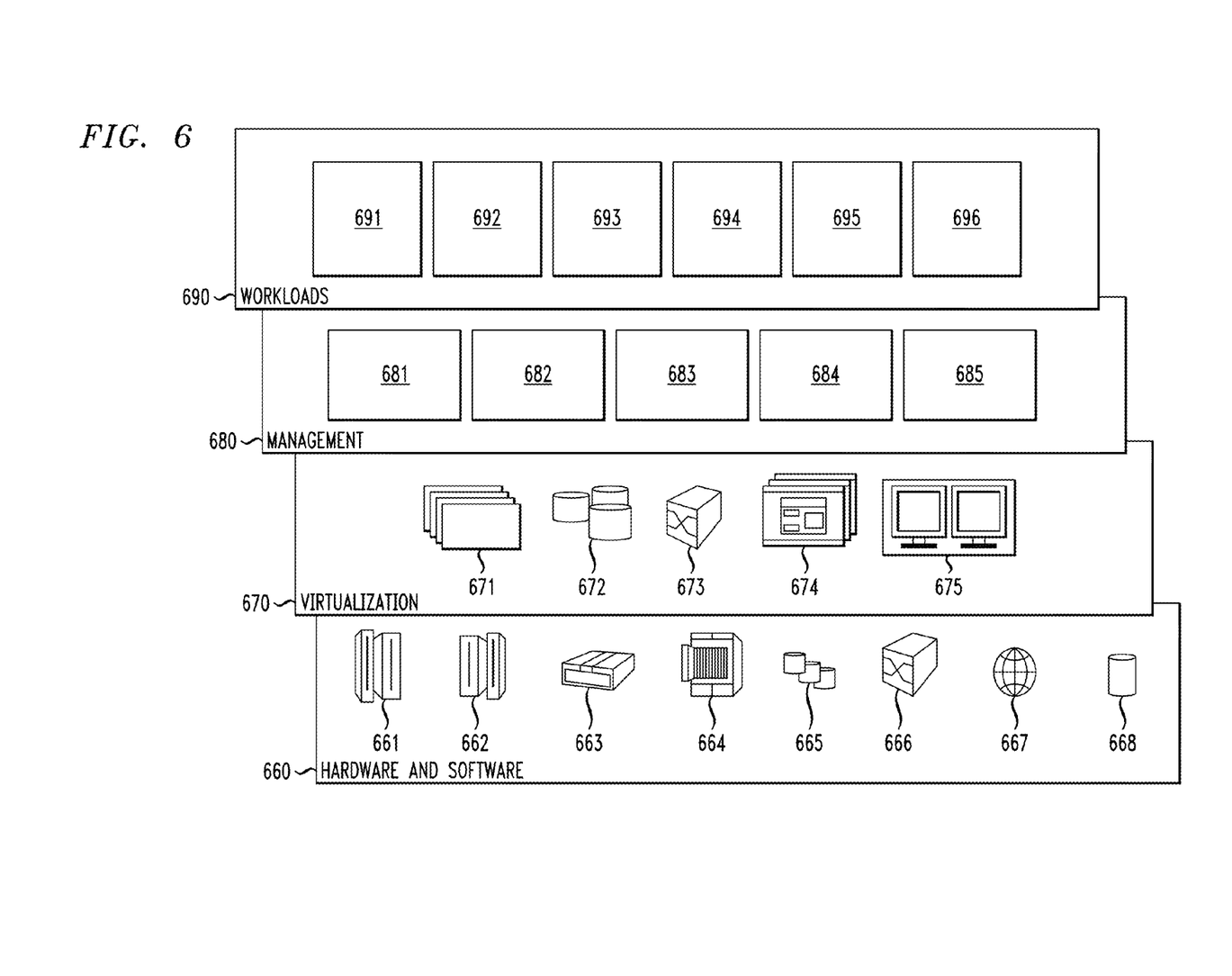
FIG. 6 depicts abstraction model layers, according to an embodiment of the invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and object detection and tracking 696, which may implement the functionality described above with respect to FIGS. 1-5.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method comprising:
   identifying at least one user device within a range of one or more sensing devices in an environment;
   determining whether the at least one user device is associated with at least one privacy profile, wherein the at least one privacy profile comprises information regarding one or more user-specified restrictions on operation of the one or more sensing devices;
   in response to determining that the at least one user device is associated with the at least one privacy profile:
   receiving the at least one privacy profile; and
   adjusting one or more functionalities and parameters of the one or more sensing devices based on the at least one privacy profile; and
   broadcasting information regarding the one or more sensing devices to the at least one user device;
   wherein the broadcasted information comprises information regarding presence of the one or more sensing devices and at least one of a capacity profile and an activity profile of the one or more sensing devices; and
   wherein the steps of the method are implemented by at least one processing device comprising a processor operatively coupled to a memory.

2. The method of claim 1, wherein the one or more sensing devices are connected to a server over a network, and wherein the server broadcasts the information regarding the one or more sensing devices to the at least one user device.

3. The method of claim 1, wherein the one or more sensing devices are capable of broadcasting the information directly to the at least one user device.

4. The method of claim 1, wherein the broadcasted information is received by a user application running on the at least one user device.

5. The method of claim 1, wherein the capability profile comprises information regarding at least one of functionalities and parameters of the one or more sensing devices.

6. The method of claim 1, wherein the activity profile comprises information regarding at least one of a current status and an identity of an operator of the one or more sensing devices.

7. The method of claim 1, further comprising activating the at least one privacy profile prior to adjusting the one or more functionalities and parameters of the one or more sensing devices.

8. The method of claim 7, wherein activing the at least one privacy profile further comprises setting the at least one privacy profile as a current privacy profile.

9. The method of claim 1, wherein the at least one privacy profile restricts operation of the one or more sensing devices having a sensing resolution above a threshold specified in the at least one privacy profile.

10. The method of claim 1, wherein the at least one privacy profile comprises a plurality of privacy profiles, and further comprising:
    determining a collective profile from the plurality of privacy profiles;
    wherein the one or more functionalities and parameters of the one or more sensing devices are adjusted based on the collective profile.

11. The method of claim 1, further comprising broadcasting any violation of the at least one privacy profile.

12. The method of claim 1, wherein the one or more sensing devices further comprise a controller module capable of adjusting the one or more functionalities and parameters of the one or more sensing devices.

13. The method of claim 12, wherein the at least one controller module is operatively coupled to the at least one user device and operation of the one or more sensing devices is controlled via the at least one user device.

14. An apparatus, comprising:
    a memory; and
    a processor operatively coupled to the memory forming at least a part of one or more sensing devices in an environment and configured to:
    identify at least one user device within a range of one or more sensing devices in an environment;
    determine whether the at least one user device is associated with at least one privacy profile, wherein the at least one privacy profile comprises information regarding one or more user-specified restrictions on operation of the one or more sensing devices;
    in response to a determination that the at least one user device is associated with the at least one privacy profile;
    receive the at least one privacy profile; and
    adjust one or more functionalities and parameters of the one or more sensing devices based on the at least one privacy profile; and
    broadcast information regarding the one or more sensing devices to the at least one user device;
    wherein the broadcasted information comprises information regarding presence of the one or more sensing devices and at least one of a capacity profile and an activity profile of the one or more sensing devices.

15. The apparatus of claim 14, wherein the broadcasted information is received by a user application running on the at least one user device.

16. The apparatus of claim 14, wherein the processor is further configured to activate the at least one privacy profile prior to adjusting the one or more functionalities and parameters of the one or more sensing devices.

17. The apparatus of claim 14, wherein the at least one privacy profile restricts operation of the one or more sensing devices having a sensing resolution above a threshold specified in the at least one privacy profile.

18. The apparatus of claim 14, wherein the at least one privacy profile comprises a plurality of privacy profiles, and wherein the processor is further configured to:
    determine a collective profile from the plurality of privacy profiles;
    wherein the one or more functionalities and parameters of the one or more sensing devices are adjusted based on the collective profile.

19. The apparatus of claim 14, wherein the processor is further configured to broadcast any violation of the at least one privacy profile.

20. An article of manufacture comprising a processor readable storage medium for storing processor readable program code which, when executed, causes a processor to:
- identify at least one user device within a range of one or more sensing devices in an environment;
- determine whether the at least one user device is associated with at least one privacy profile, wherein the at least one privacy profile comprises information regarding one or more user-specified restrictions on operation of the one or more sensing devices;
- in response to a determination that the at least one user device is associated with the at least one privacy profile:
  - receive the at least one privacy profile; and
  - adjust one or more functionalities and parameters of the one or more sensing devices based on the at least one privacy profile; and
- broadcast information regarding the one or more sensing devices in an environment to the at least one user device;
  - wherein the broadcasted information comprises information regarding presence of the one or more sensing devices and at least one of a capacity profile and an activity profile of the one or more sensing devices.

* * * * *